US007929602B2

(12) United States Patent
Kim et al.

(10) Patent No.: US 7,929,602 B2
(45) Date of Patent: *Apr. 19, 2011

(54) APPARATUS AND METHOD FOR PERFORMING DYNAMIC CAPACITANCE COMPENSATION (DCC) IN LIQUID CRYSTAL DISPLAY (LCD)

(75) Inventors: Wooshik Kim, Yongin-si (KR); Seungwoo Lee, Seoul (KR); Woochul Kim, Uijeongbu-si (KR); Dmitri Birinov, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1472 days.

This patent is subject to a terminal disclaimer.

(21) Appl. No.: 11/271,708

(22) Filed: Nov. 14, 2005

(65) Prior Publication Data

US 2006/0098879 A1 May 11, 2006

(30) Foreign Application Priority Data

Nov. 11, 2004 (KR) ........................ 10-2004-0091850

(51) Int. Cl.
*H04N 7/00* (2011.01)

(52) U.S. Cl. .................................. 375/240.03; 382/233

(58) Field of Classification Search .................. 375/240; 382/233

See application file for complete search history.

(56) References Cited

U.S. PATENT DOCUMENTS 6,181,823 B1 * 1/2001 Takahashi .................... 382/232

OTHER PUBLICATIONS

Watanabe, Windowed Motion Compensation, SPIE 1991.*
Zahar, "Predictive Block-Matching Motion Estimation Schemes for Video Compression", Southeastcon 1991.*

* cited by examiner

*Primary Examiner* — Wesley Tucker
*Assistant Examiner* — Mark Roz
(74) *Attorney, Agent, or Firm* — Staas & Halsey LLP

(57) ABSTRACT

There are provided an apparatus and method for performing dynamic capacitance compensation (DCC) in a liquid crystal display (LCD). The DCC apparatus includes: a first line buffer reading and temporarily storing pixel values of an image for each line; an encoder transforming and quantizing the pixel values stored for each line for each block and generating bit streams; a memory storing the generated bit streams; a decoder decoding the bit streams stored in the memory for the each block and outputting the decoded bit streams; a second line buffer reading and temporarily storing the decoded pixel values for the each block; and a compensation pixel value detector detecting a compensation pixel value for each pixel, from pixel value differences between pixel values of a current frame stored in the first line buffer and pixel values of a previous frame stored in the second line buffer. Therefore, it is possible to reduce the number of pins of a memory interface by reducing the number of memory device for storing pixel values of image data, required for performing DCC of a LCD, resulting in minimizing a chip size, and to enhance compression efficiency without visual deterioration in images.

36 Claims, 11 Drawing Sheets

APPARATUS AND METHOD FOR PERFORMING DYNAMIC CAPACITANCE COMPENSATION (DCC) IN LIQUID CRYSTAL DISPLAY (LCD)

CROSS-REFERENCE TO RELATED APPLICATION

This application claims the benefit of Korean Patent Application No. 10-2004-0091850, filed on Nov. 11, 2004, in the Korean Intellectual Property Office, the disclosure of which is incorporated herein in its entirety by reference.

BACKGROUND OF THE INVENTION

1. Field of the Invention

The present invention relates to Dynamic Capacitance Compensation (DCC) for a Liquid Crystal Display (LCD), and more particularly, to an apparatus and method for performing Dynamic Capacitance Compensation (DCC) of a Liquid Crystal Display (LCD), capable of minimizing a chip size and reducing picture-quality deterioration.

2. Description of the Related Art

A Liquid Crystal Display (LCD) displays characters or images using optical variations caused by injecting and arranging liquid crystals between two glass plates and then applying a voltage to change the arrangement of the liquid crystal particles. Since the LCD uses a low voltage of 1.5 through 2 V, it has been widely employed in clocks, calculators, notebook computers, etc.

However, in the LCD, a current image overlaps a previous image due to a slow response speed, which produces blurring. In general, one frame has a duration of about 16.7 ms. When a voltage is applied to both ends of a liquid crystal material, the liquid crystal material responds to the voltage after a predetermined time has elapsed. Accordingly, in order to obtain a desired pixel value, a time delay is needed and such a time delay causes blurring.

In order to improve a response speed of the LCD, Dynamic Capacitance Compensation (DCC) is used. According to the DCC, a difference between a pixel value of a previous frame for an arbitrary pixel and a pixel value of a current frame for the pixel is obtained, and a sum of a value proportional to the difference and the pixel value of the current frame is output. In order to perform the DCC, the pixel values of previous frames must be stored in advance in a memory.

However, to store the pixel values of the previous frames without compression and stably perform the DCC, a write memory for storing the previous pixel values and a read memory for reading the stored pixel values and comparing the stored pixel values with current pixel values are required.

In order to reduce memory loads, a technique of compressing image data can be considered. That is, by compressing pixel values of a previous frame to bit streams using an encoder, storing the compressed bit streams in a memory, decoding the bit streams using a decoder, and comparing the decoded bit streams with pixel values of a current frame, DCC can be performed. Conventionally, color sampling compression has been used to compress pixel values of a previous frame. In the color sampling compression, pixel values of a previous frame are compressed by YCbCr sampling and down-sampling. Here, Y represents Luminance and Cb and Cr represent Chrominance.

However, such color sampling compression causes color changes when data is compressed and has low compression efficiency.

For these reasons, conventionally, to perform DCC in an LCD, a method of storing pixel values of image data for a previous frame without compression or a method of compressing pixel values of image data by color sampling compression with picture-quality deterioration has been used.

SUMMARY OF THE INVENTION

Additional aspects and/or advantages of the invention will be set forth in part in the description which follows and, in part, will be apparent from the description, or may be learned by practice of the invention.

The present invention provides an apparatus and method for performing Dynamic Capacitance Compensation (DCC) of a Liquid Crystal Display (LCD), capable of minimizing a chip size and reducing picture-quality deterioration.

According to an aspect of the present invention, there is provided an apparatus for performing dynamic capacitance compensation (DCC) in a liquid crystal display (LCD), the apparatus including: a first line buffer reading and temporarily storing pixel values of an image for each line; an encoder transforming and quantizing the pixel values stored for each line for each block and generating bit streams; a memory storing the generated bit streams; a decoder decoding the bit streams stored in the memory for the each block and outputting the decoded bit streams; a second line buffer reading and temporarily storing the decoded pixel values for the each block; and a compensation pixel value detector detecting a compensation pixel value for each pixel, from pixel value differences between pixel values of a current frame stored in the first line buffer and pixel values of a previous frame stored in the second line buffer.

According to another aspect of the present invention, there is provided a method of performing dynamic capacitance compensation (DCC) in a liquid crystal display (LCD), the method including: (a) reading and temporarily storing pixel values of an image for each line; (b) transforming and quantizing the pixel values stored for the each line for each block and generating bit streams; (c) storing the generated bit streams; (d) decoding the stored bit streams for the each block; (e) reading and temporarily storing the decoded pixel values for the each block; and (f) detecting a compensation pixel value for each pixel from pixel value differences between pixel values of a current frame stored in operation (a) and pixel values of a previous frame stored in operation (e).

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
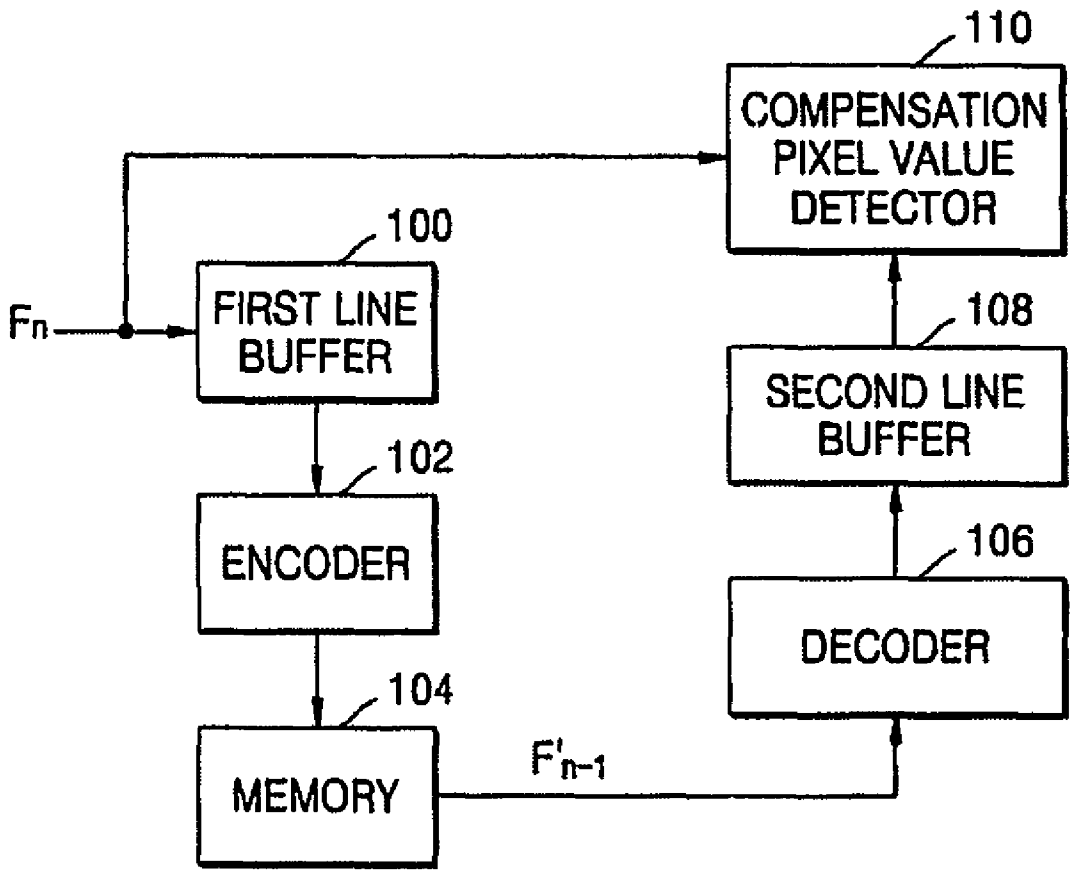
FIG. 1 is a block diagram of an apparatus for performing Dynamic Capacitance Compensation (DCC) in a Liquid Crystal Display (LCD), according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, a Liquid Crystal Display (LCD) according to the present invention will be described with respect to the appended drawings.

FIG. 1 is a block diagram of an apparatus for performing Dynamic Capacitance Compensation (DCC) of a LCD, according to an embodiment of the present invention. The DCC apparatus includes a first line buffer 100, an encoder 102, a memory 104, a decoder 106, a second line buffer 108, and a compensation pixel value detector 110.

The first line buffer 100 reads and temporarily stores pixel values of an image for each line. In detail, the first line buffer 100 reads pixel values of an image of a current frame $F_n$ for each line, temporarily stores the read pixel values for a predetermined number of lines, and outputs them to the decoder 102. If a unit block in which pixel values are encoded by the encoder 102 is a M×M block, the predetermined number of lines is M−1. For example, if a block is a 4×4 block, the first line buffer 100 reads and temporarily stores pixel values corresponding to three lines. When the first line buffer 100 reads pixel values corresponding to a fourth line, the first line buffer 100 outputs the pixel values corresponding to these four lines to the encoder 102.

The encoder 102 transforms and quantizes pixel values of each line for each block and generates bit streams. If the encoder 102 receives pixel values of an image corresponding to each block from the first line buffer 100, the encoder 102 transforms and quantizes the pixel values for each block, generates bit streams, and outputs the generated bit streams to the memory 104.

Figure 2:
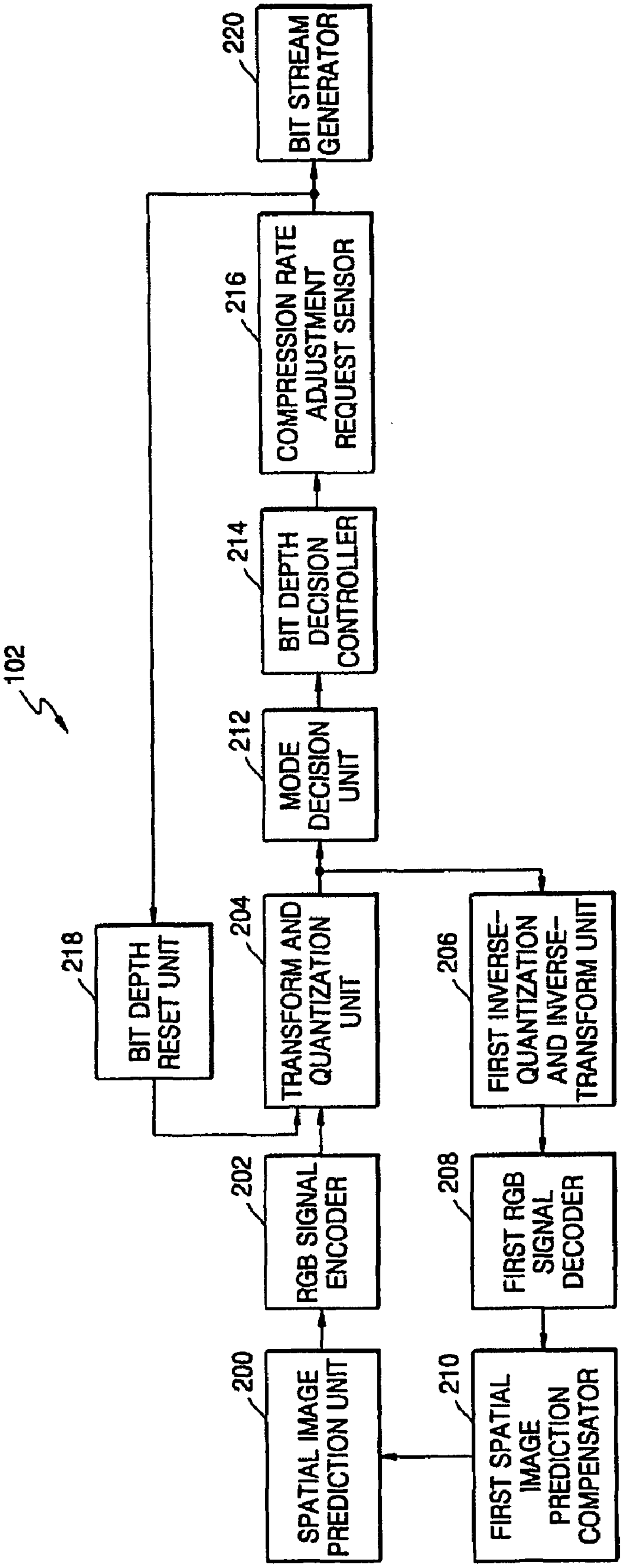
FIG. 2 is a block diagram of an encoder shown in FIG. 1, according to an embodiment of the present invention.

FIG. 2 is a block diagram of the encoder 102 shown in FIG. 1, according to an embodiment of the present invention. The encoder 102 includes a spatial image predictor 200, a RGB signal encoder 202, a transform and quantization unit 204, a first inverse-quantization and inverse-transform unit 206, a first RGB signal decoder 208, a first spatial image prediction compensator 210, a mode decision unit 212, a bit depth decision controller 214, a compression rate adjustment request sensor 216, a bit depth reset unit 218, and a bit stream generator 220.

The spatial image predictor 200 spatially predicts pixel values of a current block using blocks spatially adjacent to the current block and outputs the predicted pixel values to the RGB signal encoder 202. A process of removing spatial redundancy of a block using blocks spatially adjacent to the block is called intra prediction. That is, the spatially predicted pixel values are obtained by estimating prediction directions from a current block and blocks spatially adjacent to the current block for each color component. The spatial image predictor 200 performs intra prediction by removing spatial redundancy between a current block and its peripheral blocks, using spatially predicted and compensated results received from the first spatial image prediction compensator 210, that is, using restored blocks of a current image.

The RGB signal encoder 202 removes redundant information among R, G, and B pixel values of the current block, according to the spatially predicted results of the current block, encodes a resultant RGB signal from which the redundant information is removed, and outputs the encoded RGB signal to the transform and quantization unit 204. In detail, the RGB signal encoder 202 removes redundant R, G, and B pixel values using correlation of spatially predicted pixel values for R, G, and B components, and encodes a RGB signal from which the redundant components are removed.

The transform and quantization unit 204 transforms and quantizes the pixel values in the block and outputs the transformed and quantized pixel values to the first inverse-quantization and inverse-transform unit 206 and the mode decision unit 212. For example, the transform and quantization unit 204 divides and transforms a time-based image signal into frequency-based image signals using Discrete Cosine Transform (DCT). That is, the transform and quantization unit 204 divides and transforms a time-based image signal into high-frequency parts requiring high signal power and low-frequency parts requiring low signal power. After the DCT is performed, the high-frequency parts requiring high signal power are distributed in the upper and left region of the transformed and quantized block and the low-frequency parts requiring low signal power are distributed in the lower and right region of the transformed and quantized block. The block transformed and quantized by the transform and quantization unit 204 is referred to as a transform block.

The first inverse-quantization and inverse-transform unit 206 receives the transform block from the transform and quantization unit 204, performs inverse-quantization and inverse-transform on the transformed and quantized coefficients of the transform block, and outputs the inverse-quantizated and inverse-transformed coefficients to the first RGB signal decoder 208.

The first RGB signal decoder 208 receives the inverse-quantized and inverse-transformed coefficients from the first inverse-quantization and inverse-transform unit 206, decodes a RGB signal of the transform block, and outputs the decoded RGB signal to the first spatial image prediction compensator 210.

The first spatial image prediction compensator 210 receives the decoded RGB signal from the first RGB signal decoder 208, compensates for the spatially predicted pixel values of the transform block, and outputs the compensated pixel values to the spatial image predictor 200.

The mode decision unit 212 sets a division mode for dividing the transform block into a first area in which at least one coefficient is not “0” and a second area in which all coefficients are “0”, along a predetermined diagonal line, and outputs the division mode to the bit depth decision controller 214.

Figure 3A:
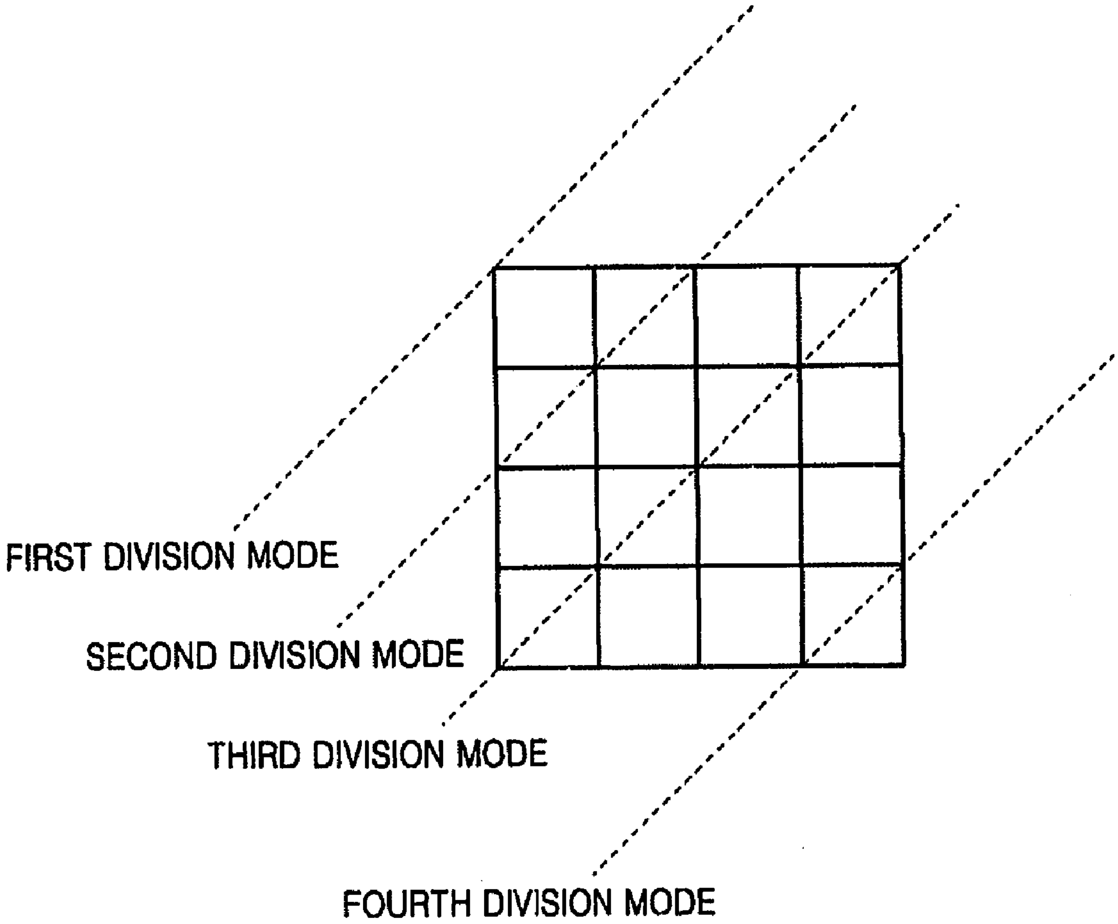
FIG. 3A is a view for explaining four division modes for a 4×4 transform block.

FIG. 3A is a view for explaining four division modes for a 4×4 transform block.

Figure 3B:
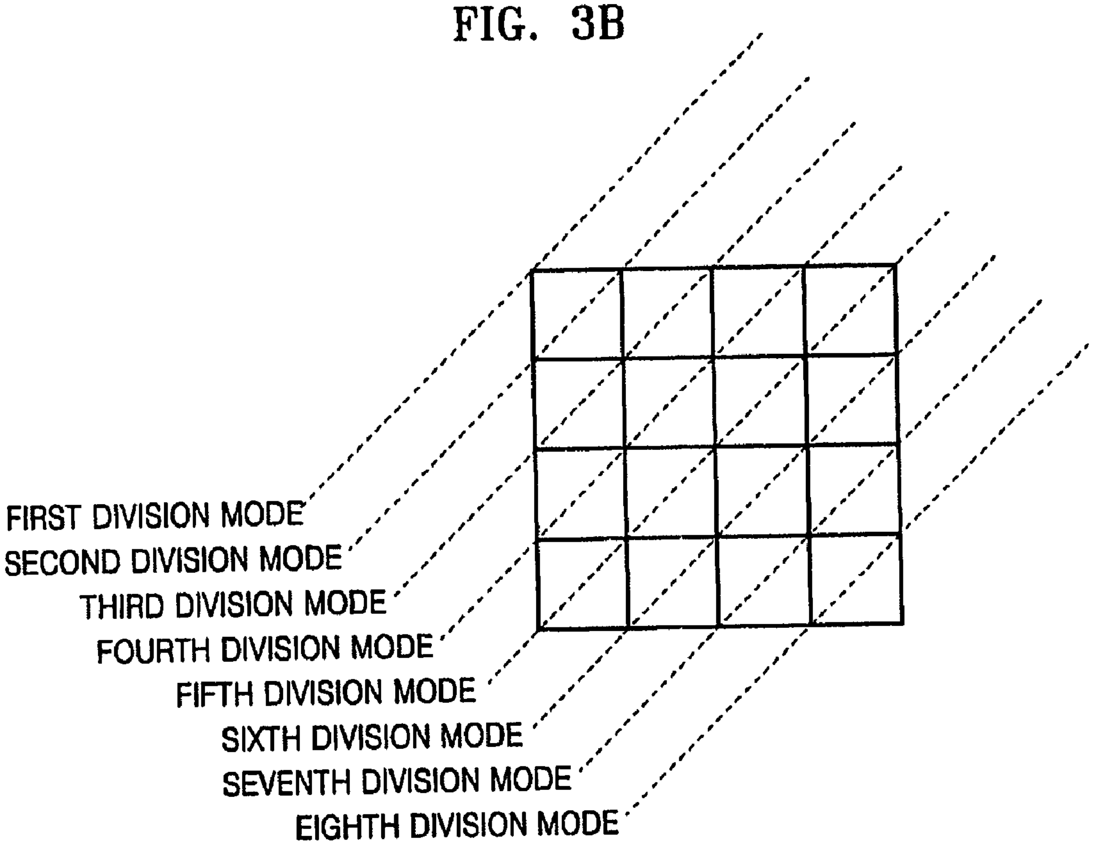
FIG. 3B is a view for explaining eight division modes for a 4×4 transform block.

FIG. 3B is a view for explaining eight division modes for a 4×4 transform block.

Diagonal lines for setting first through fourth division modes for a 4×4 transform block are not limited to those shown in FIG. 3A. In FIG. 3A, 2 bits of a binarized bit stream must be allocated to identify the first through fourth division modes. For example, if identification information of the first division mode is "0", a corresponding bit stream is "00", if identification information of the second division mode is "1", a corresponding bit stream is "01", if identification information of the third division mode is "2", a corresponding bit stream is "10", and if identification information of the fourth division mode is "3", a corresponding bit stream is "11".

In FIG. 3B, 3 bits of a binarized bit stream must be allocated to identify first through eighth division modes in a 4×4 transform block. For example, if identification information of the first division mode is "0", a corresponding bit stream is "000", if identification information of the second division mode is "1", a corresponding bit stream is "001", if identification information of the third division mode is "2", a corresponding bit stream is "010", if identification information of the fourth division mode is "3", a corresponding bit stream is "011", if identification information of the fifth division mode is "4", a corresponding bit stream is "100", if identification information of the sixth division mode is "5", a corresponding bit stream is "101", if identification information of the seventh division mode is "6", a corresponding bit stream is "110", and if identification information of the eighth division mode is "7", a corresponding bit stream is "111".

FIGS. 4A through 4D illustrate coefficients for the four division modes shown in FIG. 3A, respectively, according to an embodiment of the present invention.

Figure 4A:
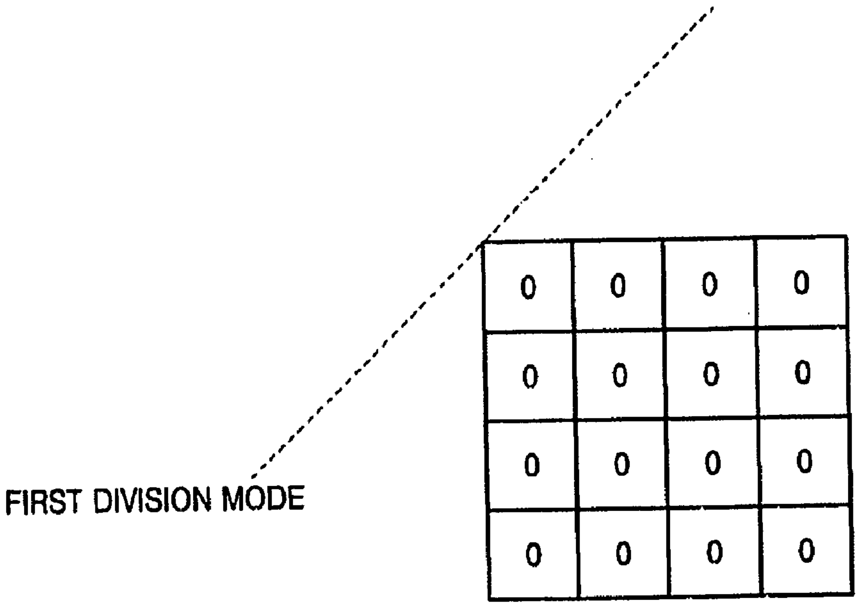
FIGS. 4A through 4D illustrate coefficients for the four division modes shown in FIG. 3A, respectively, according to an embodiment of the present invention.

In FIG. 4A, a diagonal line is disposed in the upper and left most portion of a transform block. This mode is generally called a 'skip mode'. In the skip mode, only a second area in which all coefficients are "0" exists without a first area in which at least one coefficient is not "0". As such, if all coefficients of a transform block are "0", it is determined that a first division mode is set.

Figure 4B:
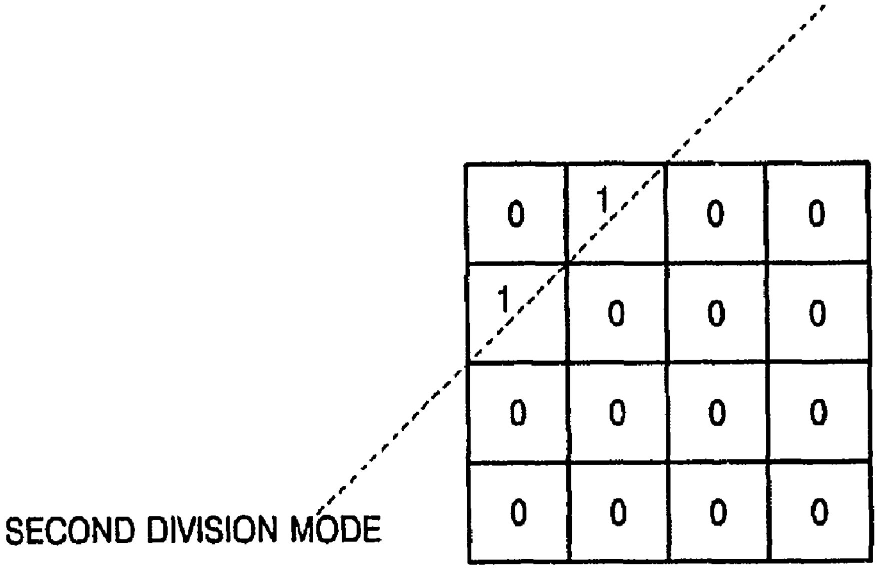

In FIG. 4B, a diagonal line is disposed in the upper and left portion of a transform block. In this case, both a first area in which at least one coefficient is not "0" and a second area in which all coefficients are "0" exist. As such, if all coefficients included in the lower and right portion of a transform block (that is, all coefficients below a diagonal line of a second division mode) are "0", it is determined that a second division mode is set.

Figure 4C:
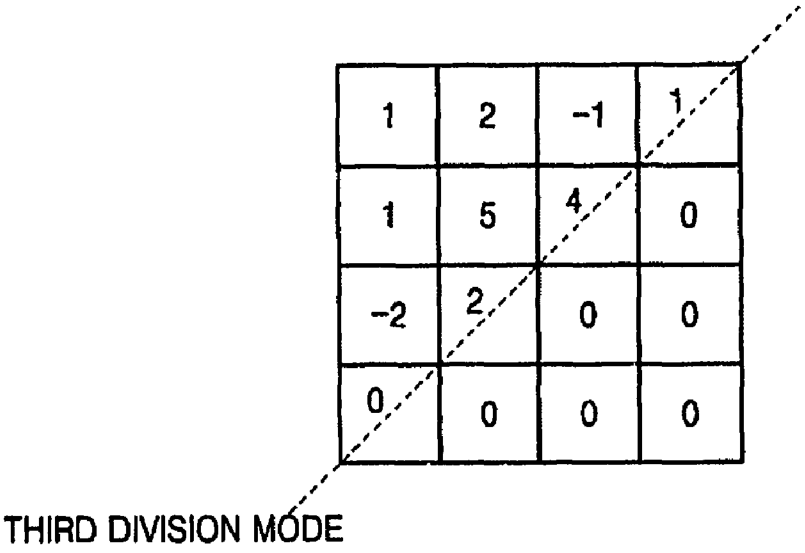

In FIG. 4C, a diagonal line traverses the center of a transform block. In this case, both a first area in which at least one coefficient is not "0" and a second area in which all coefficients are "0" exist. As such, if all coefficients included in the lower and right portion of a transform block (that is, all coefficients below a diagonal line of a third division mode) are "0", it is determined that a third division mode is set.

Figure 4D:
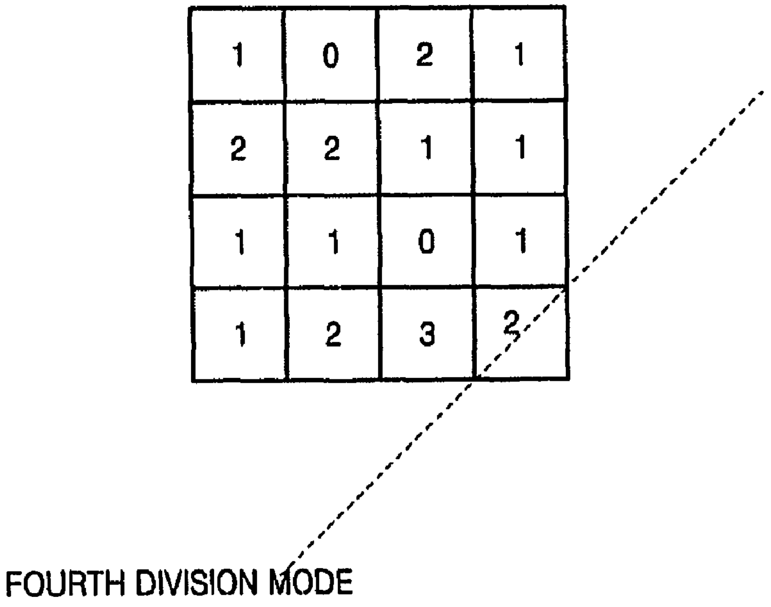

In FIG. 4D, a diagonal line is disposed in the lower and right most portion of a transform block. In this case, only a first area in which at least one coefficient is not "0" exists without a second area in which all coefficients are "0". As such, if no coefficient included in the lower and right most portion of a transform block is "0" (that is, no coefficient below a diagonal line of a fourth division mode is "0"), it is determined that a fourth division mode is set.

Meanwhile, an embodiment in which a transform block is divided into eight division modes, as shown in FIG. 3B, will be analogized from the above descriptions with reference to FIGS. 4A through 4D, and, therefore, detailed description thereof is omitted.

For example, the mode decision unit 212 decides a division mode in which all coefficients of a second area are "0", among the first through fourth division modes of FIG. 3A, or decides a division mode in which all coefficients of a second area are "0", among the first through eighth division modes of FIG. 3B.

The bit depth decision controller 214 decides a second bit depth representing the number of bits required for binarizing each coefficient in the first area, according to whether or not all the coefficients of the first area are within a predetermined value range, in response to a division mode decided by the mode decision unit 112, and outputs the decided second bit depth to the compression rate adjustment request sensor 216. The bit depth means the number of bits used to store information for each pixel in computer graphics. The predetermined value ranges are defined in advance.

Table 1 is a look-up table showing second bit depths corresponding to predetermined value ranges.

TABLE 1

| Division mode identification information | Predetermined value range of coefficients of first area | Second bit depth |
|---|---|---|
| 1 | −2 through 1 | 2 |
| 2 | −4 through 3 | 3 |
| 3 | −4 through 3 | 3 |

If it is assumed that division mode identification information shown in Table 1 represents identification information of the second through fourth division modes for the 4×4 transform block shown in FIG. 3A, identification information of the second division mode is "1", identification information of the third division mode is "2", and identification information of the fourth division mode is "3". The first division mode, which is a 'skip mode', is not listed in Table 1, because no bit stream for coefficients in the skip mode is generated in the bit stream generator 220 to be described later.

The bit depth decision controller 214 stores information, such as the look-up table shown in Table 1, in a predetermined memory, to decide a second bit depth.

Figure 5:
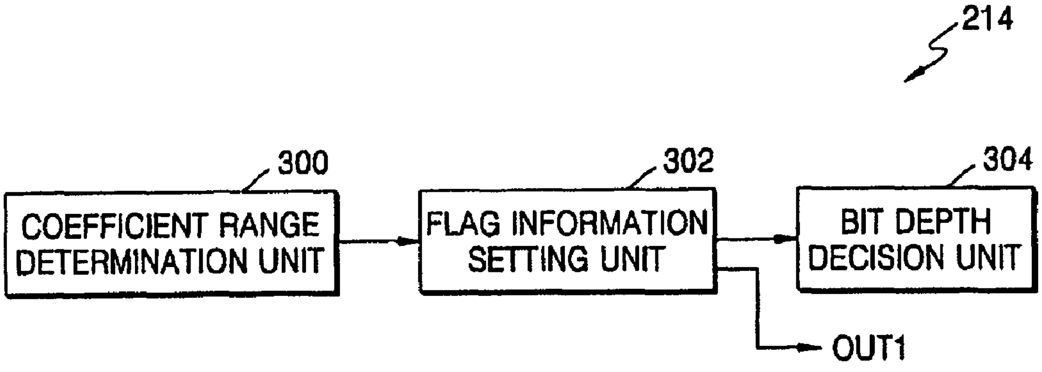
FIG. 5 is a block diagram of a bit depth decision controller shown in FIG. 2, according to an embodiment of the present invention.

FIG. 5 is a block diagram of the bit depth decision controller 214 shown in FIG. 2, according to an embodiment of the present invention. The bit depth decision controller 214 includes a coefficient range determination unit 300, a flag information setting unit 302, and a bit depth decision unit 304.

The coefficient range determination unit 300 determines whether all coefficients of a first area are within a predetermined value range, and outputs the determined result to the flag information setting unit 302. For example, if it is assumed that a predetermined value range, as shown in Table 1, is "−2 through 1" and a division mode decided by the mode decision unit 212 is a second division mode (here, identification information of the second division mode is "1'), the coefficient range determination unit 300 determines whether all coefficients of a first area of the second division mode are within a predetermined value range "−2 through 1".

If all the coefficients of the first area are between −2 and 1, the flag information setting unit 302 sets first flag information indicating that all the coefficients of the first area are within the predetermined value range "−2 through 1", in response to the determination result of the coefficient range determination unit 300, and outputs the first flag information to the bit depth decision unit 304. FIG. 4B shows an example of the second division mode. Referring to FIG. 4B, all coefficients in a first area, corresponding to a low frequency signal, divided by the diagonal line of the second division mode are between −2 and 1. The first flag information is, for example, information indicating that all coefficients of a first area are between −2 and 1. Since the first flag information can be represented by a binarized bit stream of "0" or "1", 1 bit is allocated to the first flag information.

Meanwhile, the flag information setting unit 302 sets second flag information indicating that at least one of coefficients of a first area is not within a predetermined value range, and outputs the second flag information to the compression rate adjustment request sensor 216 through an output terminal OUT1. For example, it is assumed that the predetermined value range, as shown in Table 1, corresponds to a range "−4 through 3", and a division mode decided by the mode decision unit 212 is a third division mode (here, identification information of the third division mode is "2"). Referring to FIG. 4C, all coefficients of a first area, corresponding to a low frequency signal, divided by a diagonal line of the third division mode are not between −4 and 3. The second flag information is, for example, information indicating that all coefficients of a first area are not between −4 and 3. Since the second flag information can be represented by a binarized bit stream of "0" or "1", 1 bit is allocated to the second flag information. If first flag information is "1", second flag information is "0".

The bit depth decision unit 304 decides a second bit depth, in response to first flag information set by the flag information setting unit 302, and outputs the decided second bit depth to the compression rate adjustment request sensor 216.

The bit depth decision unit 304 decides the second bit depth according to a division mode and a predetermined value range. For example, if first flag information is set, the bit depth decision unit 304, as shown in Table 1, decides a second bit depth "2", which satisfies a second division mode and corresponds to division mode identification information "1" and a predetermined value range "−2 through 1". That is, the bit depth decision unit 304 decides a second bit depth to generate a bit stream corresponding to 2 bits for each coefficient of the first area.

Also, the bit depth decision unit 304 can decide the second bit depth to a specific bit depth regardless of the type of a division mode.

The compression rate adjustment request sensor 216 senses whether adjustment of a compression rate of a transform block is requested, in response to a control signal received from the bit depth decision controller 214. If adjustment of the compression rate of the transform block is requested, the compression rate adjustment request sensor 216 outputs the sensed result to the bit depth resetting unit 218. If adjustment of a compression rate of the transform block is not requested, the compression rate adjustment request sensor 216 outputs the sensed result to the bit stream generator 220.

The bit depth resetting unit 218 resets a first bit depth indicating the number of binarized unit bits for each coefficient of the transform block, in response to the sensed result received from the compression rate adjustment request sensor 216, and outputs the reset first bit depth to the transform and quantization unit 204. The transform and quantization unit 204 transforms and quantizes pixel values for the transform block in correspondence to the reset first bit depth.

The first bit depth means the number of bits used to binarize each coefficient of the transform block. Then, the first bit depth is reset using a quantization adjustment value for adjusting a quantization period. Table 2 shows first bit depths corresponding to quantization adjustment values.

TABLE 2

| First bit depth [bit] | Quantization adjustment value |
|---|---|
| 12 | 0 |
| 11 | 6 |
| 10 | 12 |
| 9 | 18 |
| 8 | 24 |
| 7 | 30 |
| 6 | 36 |

As shown in Table 2, as a quantization adjustment value increases, a first bit depth value relatively decreases. The first bit depth value means the number of bits used to binarize each coefficient of a transform block. Since, if a first bit depth value is small, this means that the number of bits used to represent a coefficient is small, a small bit depth value means that a compression rate is high. Accordingly, to increase a compression rate, it is needed to increase a quantization adjustment value and thus decrease a first bit depth value. However, picture quality is deteriorated due to the increase of a compression rate. On the contrary, to decrease a compression rate, it is needed to decrease a quantization adjustment value and thus increase a first bit depth value.

The bit stream generator 120 generates a bit stream for the coefficients of the first area, according to the decided division mode and second bit depth. For example, if it is assumed that a predetermined value range, as shown in Table 1, corresponds to "−2 through 1" and a division mode decided by the mode decision unit 212 is a second division mode, a second bit depth, as shown in Table 1, is decided to 2 [bits]. Referring to FIG. 4B showing an example of a second division mode, in the case that bit streams for the coefficients of the first area shown in FIG. 4B are generated according to the second bit depth 2, a bit stream of a coefficient "0" is "00" and bit streams of two coefficients "1" are "01".

If all coefficients of a transform block are "0", the bit stream generator 120 generates a bit stream for only identification information of a division mode. For example, as shown in FIG. 4A, in the case of the first division mode in which all coefficients of a transform block are "0", the bit stream generator 120 generates a bit stream "0" corresponding to identification information of the first division mode, and generates no bit stream for transformed and quantized coefficients. If four modes are provided, a mode can be represented by 2 bits and a bit stream for identification information "0" of a first division mode can be "00".

Also, if the total number of bits used when bit streams of all coefficients of a first area are generated is equal to or greater than the total number of bits used when bit streams of pixel values of a transform block are generated, the bit stream generator 130 generates bit streams of the pixel values of the transform block. For example, if a 4×4 block not subjected to transform and quantization has pixel values each with 8 bits of a bit depth and bit streams are generated using the pixel values of the 4×4 block without compression, 128 bits (16×8=128) are required. If the total number of bits required is greater than or equal to 128 [bits], the bit stream generator 120 generates bit streams of the pixel values of the block not subjected to transform and quantization, without generating bit streams of the transformed and quantized coefficients.

Meanwhile, the bit stream generator 120 generates bit streams of the coefficients of the first area, according to the decided division mode and the predetermined first bit depth. For example, it is assumed that a predetermined value range, as shown in Table 1, is "−4 through 3" and a division mode decided by the mode decision unit 212 is a third mode. FIG. 4C shows an example of the third division mode. In the case of FIG. 4C, the flag information setting unit 302 sets second flag information indicating that all coefficients of a first area is not within a predetermined range "−4 through 3". If the second flag information is set by the flag information setting unit 302 and no second bit depth is decided, the bit stream generator 120 generates bit streams for the coefficients of the first area according to a previously set first bit depth (for example, 9 bits).

The memory 104 stores bit streams generated by the encoder 102. In the present invention, since pixel values for previous frames are compressed and stored, a high capacity memory is not required. Accordingly, in the present invention, all of a write memory for storing pixel values of previous frames and a read memory for comparing stored pixel values with pixel values of a current frame, are not required, differently from a conventional technique. That is, in the present invention, a single SDRAM (Synchronous Dynamic Random Access Memory) can be used.

The decoder 106 decodes bit streams of pixel values for a previous frame $F'_{n-1}$ stored in the memory 104 for each block, and outputs the decoded bit streams to the second line buffer 108.

Figure 6:
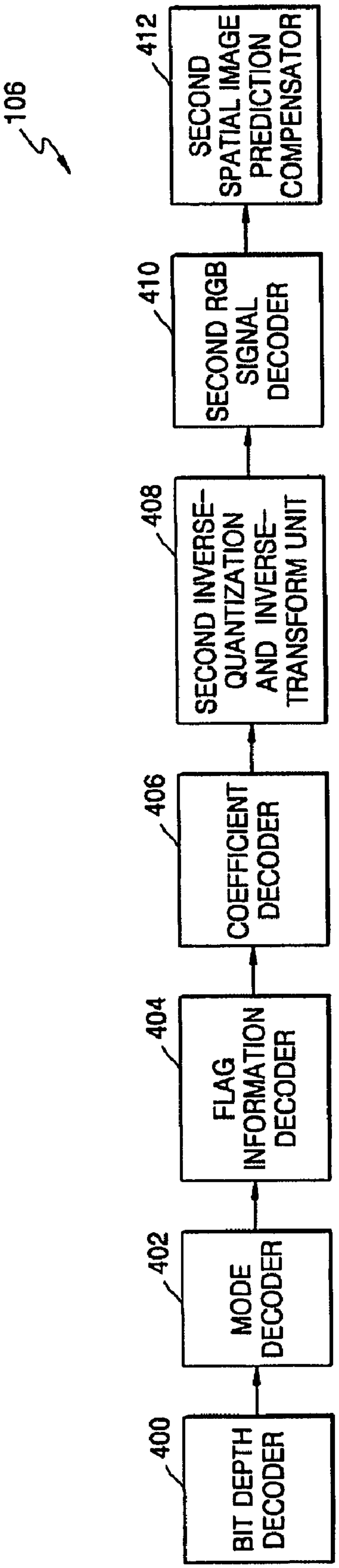
FIG. 6 is a block diagram of a decoder shown in FIG. 1, according to an embodiment of the present invention.

FIG. 6 is a block diagram of the decoder 106 shown in FIG. 1, according to an embodiment of the present invention. Referring to FIG. 6, the decoder 106 includes a bit depth decoder 400, a mode decoder 402, a flag information decoder 404, a coefficient decoder 406, a second inverse-quantization and inverse-transform unit 408, a second RGB signal decoder 410, and a second spatial image prediction compensator 412.

The bit depth decoder 400 decodes first bit depth information representing the number of bits required to binarize coefficients of a transform block, and outputs the decoded first bit depth information to the mode decoder 302. For example, if a first bit depth, which has been set in advance or reset when encoding, is information indicating 9 [bits], the bit depth decoder 400 decodes the first bit depth information.

The mode decoder 402 decodes a bit stream for a division mode to divide the transform block into a first area and a second area, in response to the decoded first bit depth received from the bit depth decoder 400, and outputs the decoded bit stream to the flag information decoder 404. For example, if a bit stream for a division mode generated when encoding is a bit stream for the second division mode shown in FIG. 4B, the mode decoder 402 decodes "01" corresponding to the bit stream of the second division mode.

The flag information decoder 404 decodes a bit stream with first flag information indicating that all the coefficients of the first area are within a predetermined value range or a bit stream with second flag information indicating that at least one coefficient of the first area is not within the predetermined value range, in response to the decoded result for the division mode received from the mode decoder 402, and outputs the decoded bit stream to the coefficient decoder 406. For example, since all the coefficients of the first area of the second division mode shown in FIG. 4B are within a predetermined value range "−2 through 1" shown in Table 1, a bit stream with the first flag information for the second division mode is generated when encoding. The flag information decoder 404 decodes the first flag information for the second division mode. Also, in the third division mode shown in FIG. 4C, since one or more among the coefficients of the first area is not within the predetermined value range "−2 through 1" shown in Table 1, a bit stream with the second flag information for the third division mode is generated when encoding. The flag information decoder 404 decodes the second flag information for the third division mode.

The coefficient decoder 406 receives the decoded result of the first flag information or the second flag information from the flag information decoder 404, decodes the bit streams of the coefficients of the transform block, and outputs the decoded bit streams to the second inverse-quantization and inverse-transform unit 408. For example, the coefficient decoder 406 sequentially decodes data "00" and two data "01" which are bit streams for the coefficients of the first area shown in FIG. 4B.

The second inverse-quantization and inverse-transform unit 408 inverse-quantizes and inverse-transforms the decoded coefficients of the transform block received from the coefficient decoder 406, and outputs the inverse-quantized and inverse-transformed results to the second RGB signal decoder 410.

The second RGB signal decoder 410 receives and decodes a RGB signal of the inverse-quantized and inverse-transformed results from the second inverse-quantization and inverse-transform unit 408 and outputs the decoded RGB signal to the second spatial image prediction compensator 412.

The second spatial image prediction compensator 412 receives the decoded RGB signal from the second RGB signal decoder 410 and compensates for spatially predicted pixel values of the block whose RGB signal is decoded.

Returning to FIG. 1, the second line buffer 108 reads and temporarily stores pixel values decoded for each block from the decoder 106. The second line buffer 108 reads pixel values of an image of a previous frame $F'_{n-1}$ for each block. The second line buffer 108 temporarily stores the pixel values read for each block and outputs them to the compensation pixel value detector 110 for each line.

The compensation pixel value detector 110 detects compensation pixel values for respective pixels, using pixel value differences between the pixel values of the current frame $F_n$ stored in the first line buffer 100 and the pixel values of the previous frame $F'_{n-1}$ stored in the second line buffer 108. For example, if a pixel value of a specific pixel of a current frame $F_n$ is "128" and a pixel value of a corresponding specific pixel of a previous frame $F'_{n-1}$ is "118", the pixel compensation value detector 110 detects a compensation pixel value 178 (128+50=178) obtained by adding the current pixel value with a compensation value (for example, 50) corresponding to "10" which is a difference between the two pixel values. The compensation pixel value detector 110 stores a look-up table including compensation values corresponding to pixel value differences between pixel values of a current frame $F_n$ and pixel values of a previous frame $F'_{n-1}$.

Hereinafter, a method for performing DCC of a LCD, according to the present invention, will be described with reference to the appended drawings.

Figure 7:
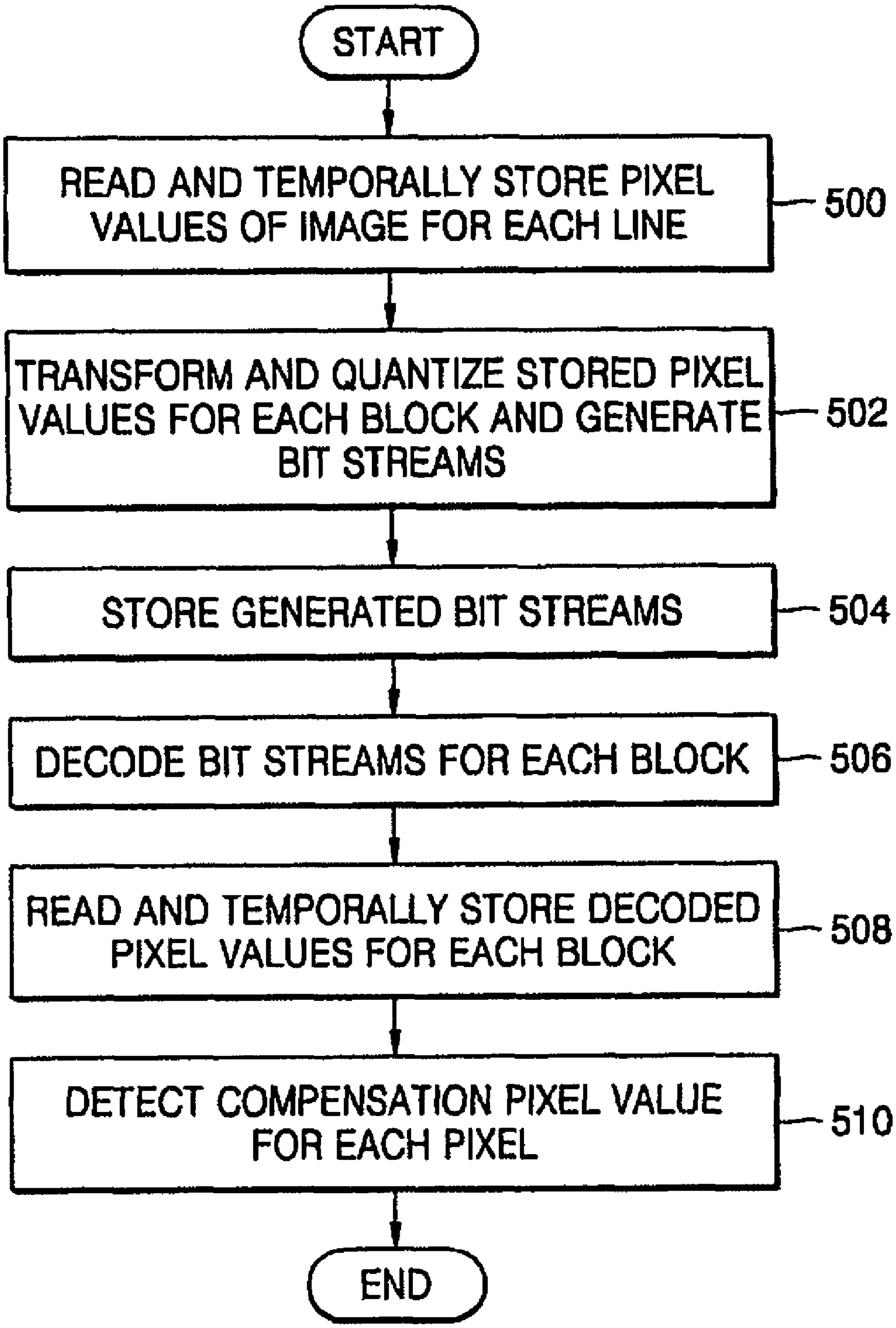
FIG. 7 is a flowchart illustrating DCC of a LCD, according to an embodiment of the present invention.

FIG. 7 is a flowchart illustrating DCC used for a LCD, according to an embodiment of the present invention.

Referring to FIG. 7, first, pixel values of an image are read and temporarily stored for each line (operation 500).

Then, the pixel values stored for each line are transformed and quantized for each block, thereby generating bit streams (operation 502).

Figure 8:
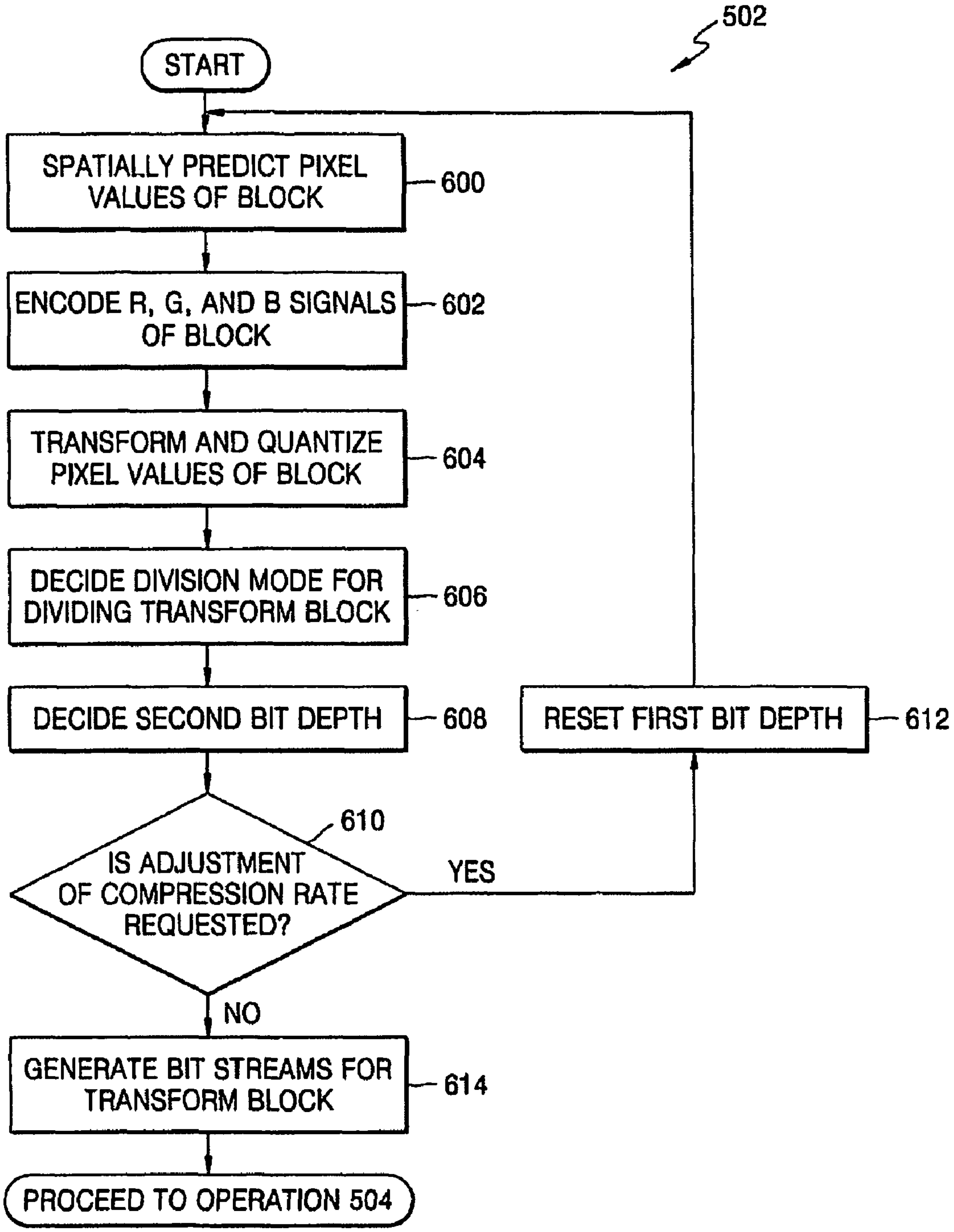
FIG. 8 is a flowchart for explaining operation 502 shown in FIG. 7, according to an embodiment of the present invention.

FIG. 8 is a flowchart for explaining operation 502 shown in FIG. 7, according to an embodiment of the present invention.

Referring to FIG. 8, first, R, G, and B pixel values of a current block are spatially predicted using blocks spatially adjacent to the current block (operation 600). The spatially predicted pixel values are prediction pixel values obtained by estimating prediction directions from the current block and blocks spatially adjacent to the current block for each color component.

After operation 600, redundant information is removed from the R, G, and B pixel values of the current block, and a RGB signal from which redundant information is removed is encoded (operation 602). When pixel values are directly spatially predicted for R, G, and B colors of an RGB image, redundant information is removed using correlation of the spatially predicted pixel values for the R, G, and B colors and a RGB signal from which the redundant information is removed is encoded.

After operation 602, the pixel values of the pixels of the block are transformed and quantized (operation 604). The pixel values are generally transformed using orthogonal transform encoding, for example, Discrete Cosine Transform (DCT). Here, the transformed and quantized block is referred to as a transform block After operation 604, a division mode for dividing the transform block into a first area in which at least one coefficient is not "0" and a second area in which all coefficients are "0", along a predetermined diagonal line, is decided (operation 606). The division mode is used to divide the transform block into an area in which all coefficients are "0" and an area in which at least one coefficient is not "0".

FIG. 3A is a view for explaining four division modes for a 4×4 transform block and FIG. 3B is a view for explaining eight division modes for a 4×4 transform block.

In a 4×4 transform block as shown in FIG. 3A, locations of diagonal lines for dividing first through fourth division modes can be arbitrarily set. At least 2 bits may be allocated to a binarized bit stream for identifying the first through fourth division modes.

In a 4×4 transform block as shown in FIG. 3B, At least 3 bits may be allocated to a binarized bit stream for identifying the first through eighth division modes.

FIGS. 4A through 4D illustrate coefficients for the four division modes shown in FIG. 3A, respectively.

After operation 606, a second bit depth representing the number of binarized bits of each coefficient of a first area is decided according to whether all coefficients of the first area are within a predetermined value range (operation 608). The second bit depth means the number of bits used for binarizing the coefficients of the first area. Table 1 is a look up table representing second bit depths corresponding to predetermined value ranges.

Figure 9:
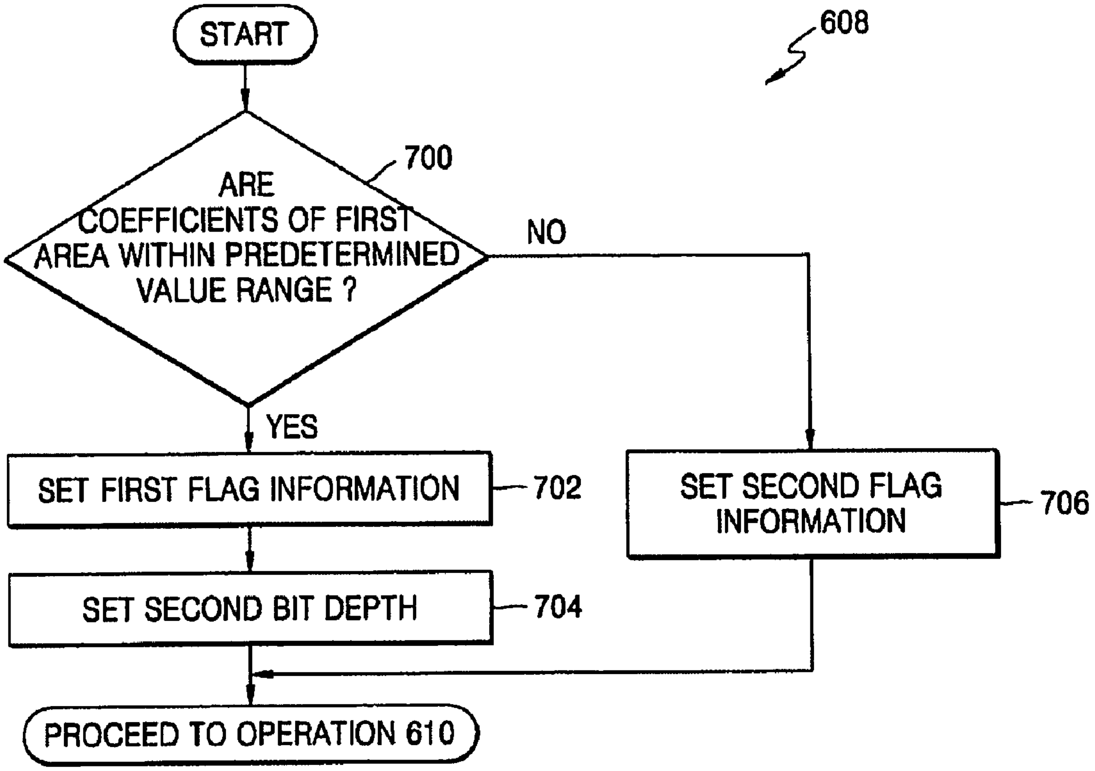
FIG. 9 is a flowchart for explaining operation 608 shown in FIG. 8, according to an embodiment of the present invention.

FIG. 9 is a flowchart for explaining operation 608 shown in FIG. 8, according to an embodiment of the present invention.

First, it is determined whether all coefficients of a first area are within a predetermined value range (operation 700).

If all the coefficients of the first area are within the predetermined value range, first flag information indicating that all the coefficients of the first area are within the predetermined value range is set (operation 702). Referring to FIG. 4B showing an example of the second division mode, all coefficients of a first area, corresponding to a low-frequency signal and located above a diagonal line of the second division mode, are between −2 and 1.

After operation 702, a second bit depth is decided in response to the set first flag information (operation 704). The second bit depth is decided according to the type of a division mode and a predetermined value range. Also, the second bit depth can be decided regardless of the type of the division mode.

In operation 700, if one or more of the coefficients of the first area is not within the predetermined value range, second flag information indicating that at least one of the coefficients of the first area is not within the predetermined value range is set (operation 706). Referring to FIG. 4C showing an example of a third division mode, all coefficients of a first area, corresponding to a low frequency signal and located above a diagonal line of the third division mode, are not between −2 and 1.

Meanwhile, after operation 608, it is determined whether adjustment of a compression rate of a transform block is requested (operation 610).

If adjustment of the compression rate of the transform block is requested, a first bit depth indicating the number of binarized bits of each coefficient of the transform block is reset and the process proceeds to operation 600 (operation 612). The first bit depth means the number of bits used to binarize each coefficient of the transform block. The first bit depth is reset using a quantization adjustment value for adjusting a quantization period. Table 2 lists first bit depths corresponding to quantization adjustment values.

However, if adjustment of the compression rate of the transform block is not requested, bit streams of the coefficients of the first area are generated according to a decided division mode and a second bit depth (operation 614). At this time, if all the coefficients of the transform block are "0", only a bit stream for identification information of the division mode is generated. Also, if the total number of bits used when the bit streams for all the coefficients of the first area are generated is equal to or greater than the total number of bits used when bit streams for all the pixel values of the block are generated, the bit streams for the pixel values of the block are generated.

Meanwhile, operation 608 can be omitted. If operation 608 is omitted, in operation 614, the bit streams for the coefficients of the first area are generated according to the decided division mode and the predetermined first bit depth. Although operation 608 is performed, if no second bit depth is decided due to setting of the second flag information, in operation 614, the bit streams for the coefficients of the first area are generated according to the decided division mode and the predetermined first bit depth.

After operation 502, the generated bit streams are stored (operation 504). In the present invention, a single memory is used as a write memory for storing pixel values of previous frames and as a read memory for comparing stored pixel values with current pixel values, differently from the conventional technique.

After operation 504, the stored bit streams are decoded for each block (operation 506).

Figure 10:
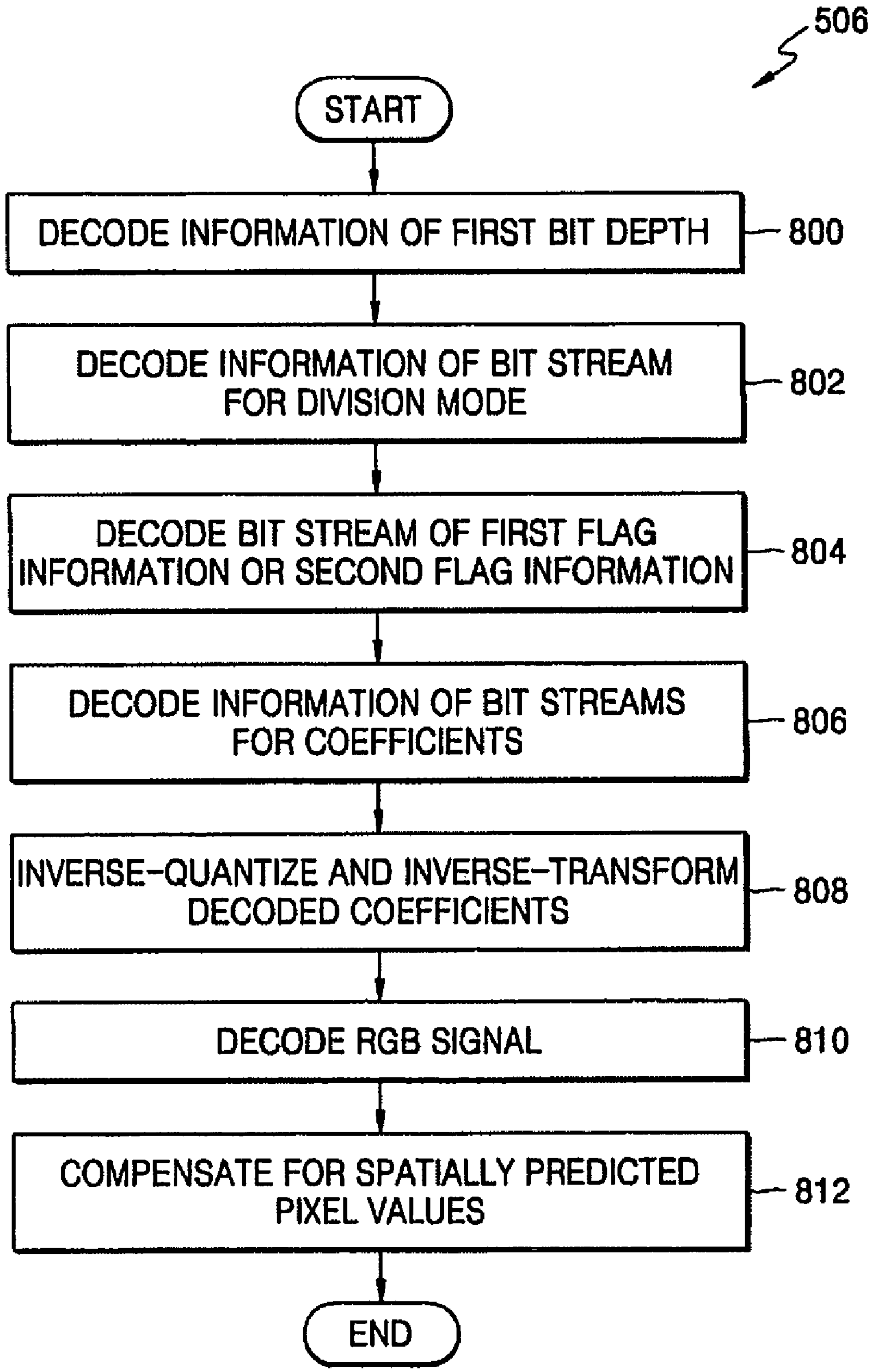
FIG. 10 is a flowchart for explaining operation 506 shown in FIG. 7, according to an embodiment of the present invention.

FIG. 10 is a flowchart for explaining operation 506 shown in FIG. 7, according to an embodiment of the present invention.

A block in which pixel values are transformed and quantized is hereinafter referred to as a transform block. Referring to FIG. 10, first bit depth information indicating the number of bits used to binarize coefficients of a transform block is decoded (operation 800).

After operation 800, information of bit streams for a division mode for dividing the transform block into a first area in which at least one of the coefficients of the transform block is not "0" and a second area in which all the coefficients of the transform block are "0", along a predetermined diagonal line, is decoded (operation 802).

After operation 802, a bit stream of first flag information indicating that all the coefficients of the first area are within a predetermined value range is decoded, or a bit stream of second flag information indicating that at least one of the coefficients of the first area is not within the predetermined value range is decoded (operation 804).

After operation 804, information of bit streams for the coefficients of the transform block is decoded (operation 806).

After operation 806, the decoded coefficients are inverse-quantized or inverse-transformed (operation 808).

After operation 808, a RGB signal of the inverse-quantized and inverse-transformed block is decoded (operation 810).

After operation 810, spatially predicted pixel values for the block whose RGB signal is decoded are compensated for when encoding (operation 812).

Meanwhile, after operation 508, the decoded pixel values are read and temporarily stored for each block (operation 508).

After operation 508, compensation pixel values for the respective pixels are detected from pixel value differences between the pixel values of the current frame stored in operation 500 and the pixel values of the previous frame stored in operation 508 (operation 510).

As described above, in an apparatus and method for performing dynamic capacitance compensation (DCC) in an LCD, according to the present invention, it is possible to reduce the number of memories for storing pixel values of image data, required to perform the DCC for improving a response speed of a LCD.

Also, in an apparatus and method for performing DCC of a LCD, according to the present invention, it is possible to reduce the number of pins of a memory interface by reducing the number of memories, resulting in minimizing a chip size.

Also, in an apparatus and method for performing DCC of a LCD, according to the present invention, it is possible to enhance compression efficiency without visual deterioration in images.

Also, in an apparatus and method for performing DCC in an LCD, according to the present invention, it is possible to easily perform real-time encoding and decoding for images.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for performing dynamic capacitance compensation (DCC) in a liquid crystal display (LCD), comprising:

a first line buffer reading and temporarily storing pixel values of an image for each line;

an encoder transforming and quantizing the pixel values stored for each line for each block and generating bit streams;

a memory storing the generated bit streams;

a decoder decoding the bit streams stored in the memory for the each block and outputting the decoded bit streams;

a second line buffer reading and temporarily storing the decoded pixel values for the each block; and a dynamic capacitance compensation pixel value detector detecting a compensation pixel value for each pixel, from pixel value differences between pixel values of a current frame stored in the first line buffer and pixel values of a previous frame stored in the second line buffer, wherein the first and second line buffer operations are applied both to the previous frame and the current frame.

2. The DCC apparatus of claim 1, wherein the encoder comprises:

a transform and quantization unit transforming and quantizing the pixel values stored for the each line; and a bit stream generator generating bit streams for a transform block in which pixel values are transformed and quantized.

3. The DCC apparatus of claim 2, wherein the encoder further comprises:

a spatial image prediction unit spatially predicting pixel values of a current block using blocks spatially adjacent to the current block;

a first inverse-quantization and inverse-transform unit inverse-quantizing and inverse-transforming the transform block; and a first spatial image prediction compensator compensating for the spatially predicted pixel values of the inverse-quantized and inverse-transformed transform block.

4. The DCC apparatus of claim 2, wherein the encoder further comprises:

an RGB signal encoder removing redundant information of R, G, and B pixel values and encoding a RGB signal from which redundant information is removed;

first inverse-quantization and inverse-transform unit inverse-quantizing and inverse-transforming the transform block; and a first RGB signal decoder decoding the encoded RGB signal of the inverse-quantized and inverse-transformed transform block.

5. The DCC apparatus of claim 2, wherein the encoder further comprises:

a mode decision unit deciding a division mode for dividing the transform block into a first area in which at least one of coefficients is not "0" and a second area in which all coefficients are "0", along a predetermined diagonal line, wherein the bit stream generator generates bit streams for the coefficients of the first area, according to the decided division mode and a first bit depth representing the number of binarized bits of each coefficient of the transform block.

6. The DCC apparatus of claim 5, wherein the bit stream generator generates a bit stream for only identification information of the division mode if all coefficients of the transform block are "0".

7. The DCC apparatus of claim 5, wherein, if the total number of bits used when bit streams for the coefficients of the first area are generated is equal to or greater than the total number of bits used when bit streams for the pixel values of the each block are generated, the bit stream generator generates bit streams for the pixel values of the each block.

8. The DCC apparatus of claim 5, wherein the encoder further comprises:

a bit depth decision controller deciding a second bit depth representing the number of binarized bits of each coefficient of the first area, according to whether all the coefficients of the first area are within a predetermined value range.

9. The DCC apparatus of claim 8, wherein the bit depth decision controller comprises:

a coefficient range determination unit determining whether all the coefficients of the first area are within the predetermined value range;

a flag information setting unit setting first flag information indicating that all the coefficients of the first area are within the predetermined value range or second flag information indicating that at least one of the coefficients of the first area is not within the predetermined value range, in response to the determined result of the coefficient range determination unit; and a bit depth decision unit deciding the second bit depth in response to the first flag information, wherein each of the bit streams for the coefficients of the first area, generated by the bit stream generator, corresponds to the second bit depth or the first bit depth.

10. The DCC apparatus of claim 9, wherein the bit depth decision unit decides the second bit depth according to the type of the division mode and the predetermined value range.

11. The DCC apparatus of claim 9, wherein the bit depth decision unit sets the second bit depth to a specific bit depth.

12. The DCC apparatus of claim 9, wherein the encoder further comprises:

a compression rate adjustment request sensor sensing whether adjustment of a compression rate is requested; and a bit depth resetting unit resetting the first bit depth representing the number of binarized bits of each coefficient of the transform block, in response to the sensed result of the compression rate adjustment request sensor.

13. The DCC apparatus of claim 1, wherein the decoder comprises:

a bit depth decoder decoding information of a first bit depth representing the number of binarized bits of each coefficient of a transform block in which pixel values are transformed and quantized;

a coefficient decoder decoding information of bit streams for coefficients of the transform block; and a second inverse-quantization and inverse-transform unit inverse-quantizing and inverse-transforming coefficients of the decoded transform block.

14. The DCC apparatus of claim 13, wherein the decoder further comprises:

a mode decoder decoding information of bit streams for a division mode for dividing the transform block into a first area in which at least one of coefficients is not "0" and a second area in which all coefficients is "0", along a predetermined diagonal line.

15. The DCC apparatus of claim 14, wherein the decoder further comprises:

a flag information decoder decoding a bit stream of first flag information indicating that all the coefficients of the first area are within a predetermined value range or a bit stream of second flag information indicating that at least one of the coefficients of the first area coefficients is not within the predetermined value range.

16. The DCC apparatus of claim 14, wherein the decoder further comprises:

a second RGB signal decoder decoding an RGB signal of the inverse-quantized and inverse-transformed transform block.

17. The DCC apparatus of claim 14, wherein the decoder further comprises:

a second spatial image prediction compensation unit compensating for spatially predicted pixel values of the inverse-quantized and inverse-transformed transform block.

18. The DCC apparatus of claim 1, wherein the memory is a Synchronous Dynamic Random Access Memory (SDRAM).

19. The DCC apparatus of claim 1, wherein the dynamic capacitance compensation pixel value detector comprises a look up table.

20. A method of performing dynamic capacitance compensation (DCC) of a liquid crystal display (LCD), comprising:

(a) reading and temporarily storing pixel values of an image for each line;

(b) transforming and quantizing the pixel values stored for the each line for each block and generating bit streams;

(c) storing the generated bit streams;

(d) decoding the stored bit streams for the each block;

(e) reading and temporarily storing the decoded pixel values for the each block; and (f) detecting a dynamic capacitance compensation pixel value for each pixel from pixel value differences between pixel values of a current frame stored in operation (a) and pixel values of a previous frame stored in operation (e), wherein the first and second line buffer operations are applied both to the previous frame and the current frame.

21. The DCC method of claim 20, wherein operation (b) comprises:

(b1) transforming and quantizing the pixel values stored for the each line; and (b2) generating bit streams for a transform block in which pixel values are transformed and quantized.

22. The DCC method of claim 21, wherein operation (b) further comprises:

(b3) spatially predicting the pixel values of the current block using blocks spatially adjacent to the current block and proceeding to operation (b1).

23. The DCC method of claim 21, wherein operation (b) further comprises:

(b4) removing redundant information among R, G, and B pixel values, decoding an RGB signal in which redundant information is removed, and proceeding to operation (b1).

24. The DCC method of claim 21, wherein operation (b) further comprises:

(b5), after operation (b1), deciding a division mode for dividing the transform block into a first area in which at least one of coefficients is not "0" and a second area in which all coefficients are "0", along a predetermined diagonal line, and then proceeding to operation (b2), wherein, in operation (b2), the bit streams of the coefficients of the first area are generated, according to the decided division mode and a first bit depth representing the number of binarized bits of each coefficient of the transform block.

25. The DCC method of claim 24, wherein, in operation (b2), if all the coefficients of the transform block are "0", a bit stream for identification information of the division mode is generated.

26. The DCC method of claim 24, wherein, in operation (b2), if the total number of bits used when bit streams for the coefficients of the first area are generated is equal to or greater than the total number of bits used when bit streams for the pixel values of the each block are generated, the bit streams for the pixel values of the each block are generated.

27. The DCC method of claim 24, wherein operation (b) further comprises:

(b6) after operation (b5), deciding a second bit depth indicating the number of binarized bits of each coefficient of the first area, according to whether all the coefficients of the first area are within a predetermined value range, and processing to operation (b2).

28. The DCC method of claim 27, wherein operation (b6) comprises:

(b61) determining whether all the coefficients of the first area are within the predetermined value range;

(b62) if all the coefficients of the first area are within the predetermined value range, setting first flag information indicating that all the coefficients of the first area are within the predetermined value range;

(b63) deciding a second bit depth in response to the first flag information; and (b64) if all the coefficients of the first area are not within the predetermined value range, setting second flag information indicating that at least one of the coefficients of the first area is not within the predetermined value range, wherein, in operation (b2), each of the bit streams of the coefficients of the first area is generated in correspondence to the second bit depth or the first bit depth.

29. The DCC method of claim 28, wherein, in operation (b63), the second bit depth is decided according to the type of the division mode and the predetermined value range.

30. The DCC method of claim 28, wherein, in operation (b63), the second bit depth is decided to a specific bit depth.

31. The DCC method of claim 21, wherein operation (b) further comprises:

(b7) after operation (b1), sensing whether adjustment of a compression rate is requested; and (b8) if the adjustment of the compression rate is requested, resetting a first bit depth representing the number of bits required to binarize each coefficient of a transform block and proceeding to operation (b1).

32. The DCC method of claim 20, wherein operation (d) comprises:

(d1) decoding information of a first bit depth representing the number of bits required to binarize each coefficient of a transform block in which pixel values are transformed and quantized;

(d2) decoding information of bit streams for coefficients of the transform block; and (d2) inverse-quantizing and inverse-transforming coefficients of the decoded transform block.

33. The DCC method of claim 32, wherein operation (d) further comprises:

(d4) after operation (d1), decoding information of a bit stream for a division mode for dividing the transform block into a first area in which at least one of coefficients is not "0" and a second area in which all coefficients are "0", along a predetermined diagonal line.

34. The method of claim 33, wherein operation (d) further comprises:

(d5) after operation (d4), decoding a bit stream of first flag information indicating that all the coefficients of the first area are within a predetermined value range or a bit stream of second flag information indicating that at least one of the coefficients of the first area is not within the predetermined value range.

35. The DCC method of claim 32, wherein operation (d) further comprises:

(d6) after operation (d3), decoding an RGB signal of the inverse-quantized and inverse-transformed transform block.

36. The DCC method of claim 32, wherein operation (d) further comprises:

(d7) after operation (d3), compensating for spatially predicted pixel values of the inverse-quantized and inverse-transformed transform block.

* * * * *

UNITED STATES PATENT AND TRADEMARK OFFICE

CERTIFICATE OF CORRECTION

PATENT NO. : 7,929,602 B2
APPLICATION NO. : 11/271708
DATED : April 19, 2011
INVENTOR(S) : Wooshik Kim et al.

It is certified that error appears in the above-identified patent and that said Letters Patent is hereby corrected as shown below:

Column 18, Line 3, In Claim 32, delete "(d2)" and insert -- (d3) --.

Signed and Sealed this
Thirty-first Day of January, 2012

David J. Kappos
*Director of the United States Patent and Trademark Office*